Sept. 26, 1967 K. K. CARMAN 3,343,376
LUBRICANT SEAL FOR COUPLINGS
Filed Sept. 13, 1965 3 Sheets-Sheet 1

INVENTOR.
KENNETH K. CARMAN
BY Boyce C. Nent
his Attorney

Sept. 26, 1967  K. K. CARMAN  3,343,376
LUBRICANT SEAL FOR COUPLINGS
Filed Sept. 13, 1965  3 Sheets-Sheet 2

INVENTOR.
KENNETH K. CARMAN
BY Boyce C. Went
his Attorney

United States Patent Office 3,343,376
Patented Sept. 26, 1967

3,343,376
LUBRICANT SEAL FOR COUPLINGS
Kenneth K. Carman, Ellicott City, Md., assignor to Koppers Company, Inc., a corporation of Delaware
Filed Sept. 13, 1965, Ser. No. 486,945
5 Claims. (Cl. 64—9)

ABSTRACT OF THE DISCLOSURE

A seal assembly for couplings, flexible gear couplings in particular, comprising a helically coiled sealing ring lying in a groove in a ring secured to the coupling sleeve, the coiled ring overlying the hub member of the coupling and in sealing engagement therewith. The groove containing the coiled ring is radially larger than the coiled ring thereby enabling the ring to conform to the surface of the coupling hub during angular misalignment of the hub while in operation to thereby retain lubricant within the coupling and exclude exterior contaminants.

---

This invention relates generally to shaft couplings and more particularly to apparatus for sealing or retaining lubricant within the couplings.

Gear couplings or spindle assemblies such as described in Haas Patent No. 2,906,106 require internal liquid lubrication because a rolling action exists between the external gear teeth on the hub and the internal gear teeth on the sleeve if there be any angular misalignment of the shafts being coupled. The couplings used in mechanical power transmission equipment need lubrication as torque loads are transmitted during rotation by shafts that may be in offset, angular, and axial misalignment.

The segmented seal described in Patent No. 2,906,106 is effective at relatively low velocities in retaining the lubricant but the segments tend to spread apart at high velocities because of centrifugal force imposed by rotation of the coupling. Providing a stronger spring to restrain the segments has the disadvantage that segments are pressed so tightly against the hub at low shaft speeds that the wear life of the seals is substantially reduced. Continuous, i.e., non-split, rings do not spread apart at high velocities; but, since the ring rides in a radial groove perpendicular to the axis of the shaft, the radial plane of contact between the ring and the hub becomes eliptical when the shafts are not aligned and the large clearance that must be provided between the ring and the hub to compensate for eliptical contact permits the lubricant to escape. Attempts to bridge the clearance with an elastomeric O-ring have not been satisfactory as the O-ring tends to extrude between the plain ring and the hub due to the constant wiping action against the hub caused by misaligned rotation so that the O-ring wears quickly and must be replaced frequently.

Accordingly, an object of the present invention is to provide a coupling for shafts with an effective seal to retain a lubricant within a coupling and to exclude contaminants. This is accomplished in accordance with this invention by providing a resilient helically coiled sealing member joined to the coupling sleeve which maintains sealing engagement with the coupling hub or shaft even during extreme rotational misalignment between the hub and the sleeve at high operating velocities.

The novel features and advantages of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:
FIGURE 1 is a sectional view of a gear coupling showing the assembly of the novel seal for use with large angular misalignment.

Figure 1:
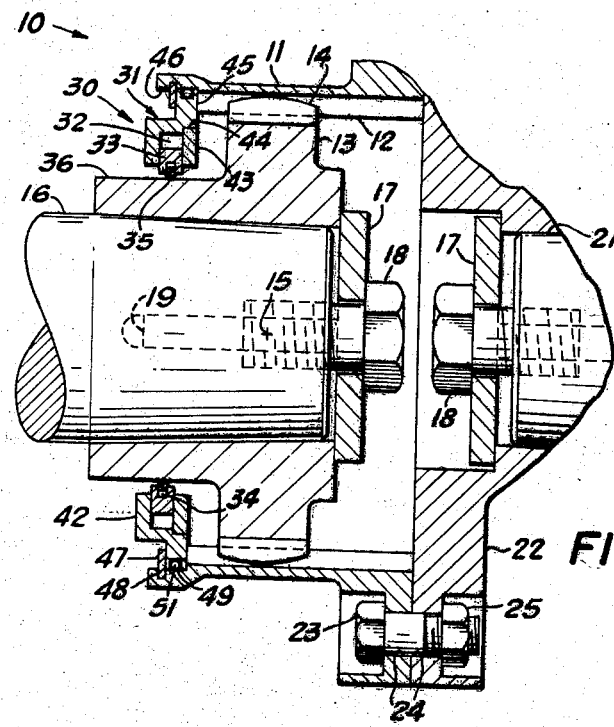

Referring to FIG. 1, a pair of generally coaxial shafts 16 and 21 are connected by a gear coupling assembly generally designated by the numeral 10. Disposed within the outer sleeve 11 of assembly 10 is a coupling hub 13 that has external spur gear teeth 14 on its outer periphery for meshing with internal teeth 12 of sleeve 11 so that rotation of the hub 13 rotates the sleeve 11 thereby transmitting torque through the coupling. The top lands of gear teeth 14 are curved about hinge point 15, as best shown in FIG. 1, and their involute faces are curved axially to permit axial misalignment between the sleeve 11 and the hub 13. Hub 13 is suitably joined to a first shaft 16 such as by providing a tapered end on shaft 16 drawn into a corresponding tapered bore in hub 13 by means of a washer 17 and threaded screw 18. Relative rotation between shaft 16 and hub 13 may be prevented by a key 19 placed in corresponding keyways cut in the shaft and hub. The sleeve 11 is joined to second shaft 21 through a flanged hub 22 joined to second shaft 21 in the same manner as hub 13 is joined to first shaft 16. Sleeve 11 may be joined to flanged hub 22 by means of bolts 23 passing through aligned apertures 24 in the sleeve and flanged hub and secured by nuts 25 threaded on bolts 23. Thus, first shaft 16 is coupled for rotation with second shaft 21 through coupling assembly 10 even though the shafts are angularly misaligned. The foregoing construction is described in greater detail in Haas Patent No. 2,906,106.

In accordance with this invention, a seal assembly generally designated by the numeral 30 is provided to retain lubricant within the coupling assembly even though the shafts be angularly misaligned during rotation. The assembly comprises a first cylindrical holder 31 disposed within sleeve 11 and joined thereto and a second cylindrical holder 33 positioned within internal annular groove 32 in holder 31. Placed within internal annular groove 34 in holder 33 is a helically coiled sealing element 35 whose internal periphery overlies a shoulder portion 36 of hub 13 and is in resilient engagement therewith. If preferred, sealing element 35 may be in resilient engagement with the shaft 16 rather than the shoulder portion 36.

The sealing ring 35 is preferably made of metal, such as steel, although other materials may be used such as non-ferrous metals, hard rubber, phenolic resin, and other plastic materials. It is necessary that the material have some circumferential resiliency when formed as will be further described. It is desirable that the material possess good wear characteristics when subjected to sliding friction. Resistance to oil is desirable since the purpose of the seal is to retain lubricant within the coupling as well as exclude contaminants.

Figure 3:
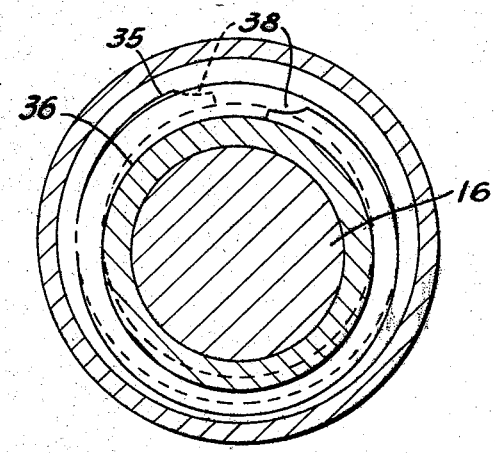
FIGURE 3 is an axial view in exaggerated proportions taken along the line III—III of FIG. 2.
Figure 4:
FIGURE 4 is a radial view of the helically coiled resilient seal showing the offset portion.

The ring 35 is a band of metal formed into a helical coil, FIGS. 3 and 4, having almost two full coils with one coil offset one band thickness between the free ends of the band as shown in FIG. 4. This results in an effective thickness of two thicknesses of the band with the outside faces 37 being substantially parallel. The free ends of the ring are preferably provided with scalloped recesses 38 to facilitate removal from retaining recesses by means of a tool, such as a screwdriver. Although the ring is shown as having two coils, it may be made with three or more if desired.

The ring 35 is maintained in sealing engagement with shoulder portion 36 of coupling hub 13 by the cylindrical holder 33 that is provided with an internal groove 34 of greater diameter than ring 35 to receive ring 35 therein in radial sliding engagement.

The first cylindrical holder 31 is likewise provided with an internal groove 32 of greater diameter than holder 33 adapted to receive holder 33 therein in radial sliding engagement. Holder 31 is made of two rings 42 and 43 joined together so as to form an internal groove 32 therein as shown in FIG. 1. The rings may be joined by providing an interference fit along their mating surfaces 44. Holder 31 is also provided with an external flange 45 adapted to fit within corresponding internal recess 46 in sleeve 11 and secured thereto by a snap ring 47 seated in a groove 48 in internal recess 46 in cooperative relation with the flange 45. Preferably, an external groove 49 is provided in holder 31 adapted to retain an O-ring 51 in sealing engagement with recess 46. If preferred, the configuration of holder 31 may be made as an integral part of sleeve 11.

In operation, flanged hub 22 is joined for rotation with shaft 21 by means of washer 17, screw 18, and key 19. Thereafter, sleeve 11 is joined for rotation with flanged hub 22 by means of bolts 23 inserted in aligned apertures 24 and secured by nuts 25.

To assemble the seal assembly 30, seal ring 35 is squeezed radially with appropriate tools until its outside diameter is small enough to permit it to be inserted in groove 34 of holder 33; holder 33 is then placed in groove 32 of ring 42; ring 43 is pressed into frictional engagement with ring 42 thereby completing holder assembly 31; and O-ring 51 is expanded and slipped into groove 49 of holder 31. Snap ring 47 is slipped over the coupling end of shaft 16 and thereafter seal assembly 30 is also slipped over the end of the shaft. Hub 13 is then joined for rotation with shaft 16 by means of washer 17, screw 18, and key 19. The hub 13 is then inserted within sleeve 11, the external gear teeth 14 of hub 13 being meshed in cooperative engagement with internal gear teeth 12 of sleeve 11. The axial location location of shaft 16 will be determined by the connection of the end opposite the coupling to adjacent machinery as will be understood by those skilled in the art. Whatever lubricant is desired may then be placed within the coupling. If desired, an oil filler hole may be provided for this purpose (not shown). Seal assembly 30 is then pushed into recess 46 of sleeve 11 and secured by snap ring 47. Since the inside diameter of seal ring 35 is made slightly smaller than the diameter of shoulder 36 of hub 13, the ring will be resiliently engaged with the shoulder thus preventing the escape of the lubricant since all other passages are closed to atmosphere.

Figure 2:
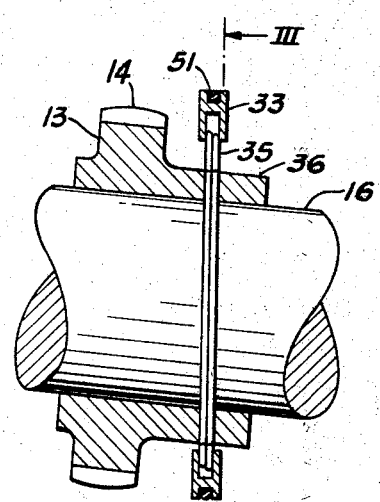
FIGURE 2 is an elevational view in exaggerated proportions showing the eliptical effect of angular misalignment on the helically coiled resilient seal.

When the coupling is operated, there is no relative rotation between hub 13 and sleeve 11. However, because of the difficulty in aligning abutting shafts, there usually is axial misalignment between the shafts. When misalignment is present, as illustrated in FIG. 2, the coils of sealing ring 35 are deflected radially into groove 34 but its inner diameter maintains contact with the shoulder 36 because of the ring's resiliency. When a great amount of misalignment is present, the ring 33 is also displaced radially in groove 32. This permits a greater radial displacement then permitted by use of the ring 35 alone.

Figure 6:
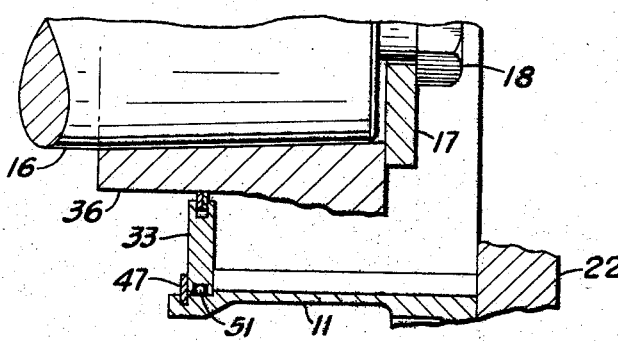
FIGURE 6 is a partial sectional view of another embodiment of the invention for use with small angular misalignment.

Another embodiment of the invention as illustrated in FIG. 6 is for use where only slight misalignment exists. This embodiment differs from FIG. 1 in that the second holder 33 is eliminated and the first holder is modified to hold seal ring 35 against the shoulder 36 in applications where misalignment is slight.

Figure 5:
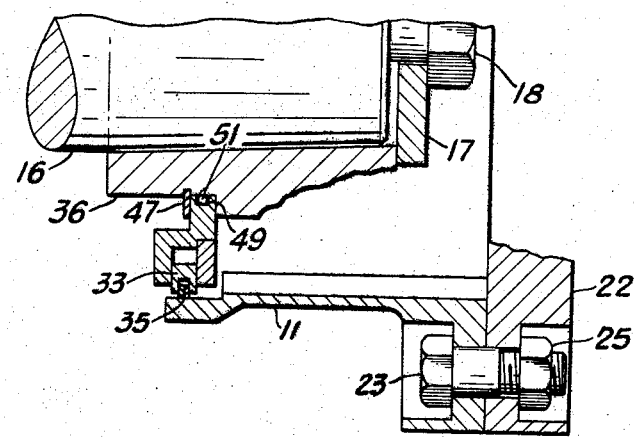
FIGURE 5 is a partial sectional view of a gear coupling showing the assembly of the novel seal for use with large angular misalignment.
Figure 7:
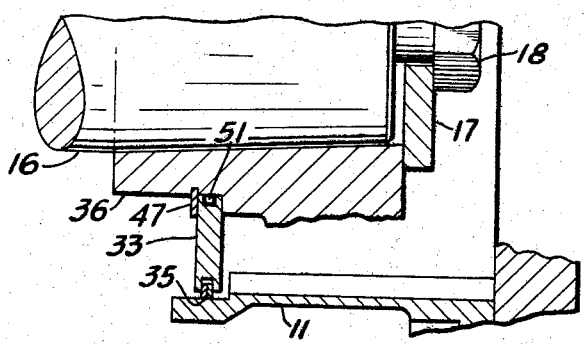
FIGURE 7 is a partial sectional view of still another embodiment of the invention for use with small angular misalignment.

Two other embodiments are illustrated in FIGS. 5 and 7. These embodiments are simply reversal parts of embodiments 1 and 6 in that the seal ring 35 is joined to the shoulder 36 and seals against the sleeve 11.

Figure 8:
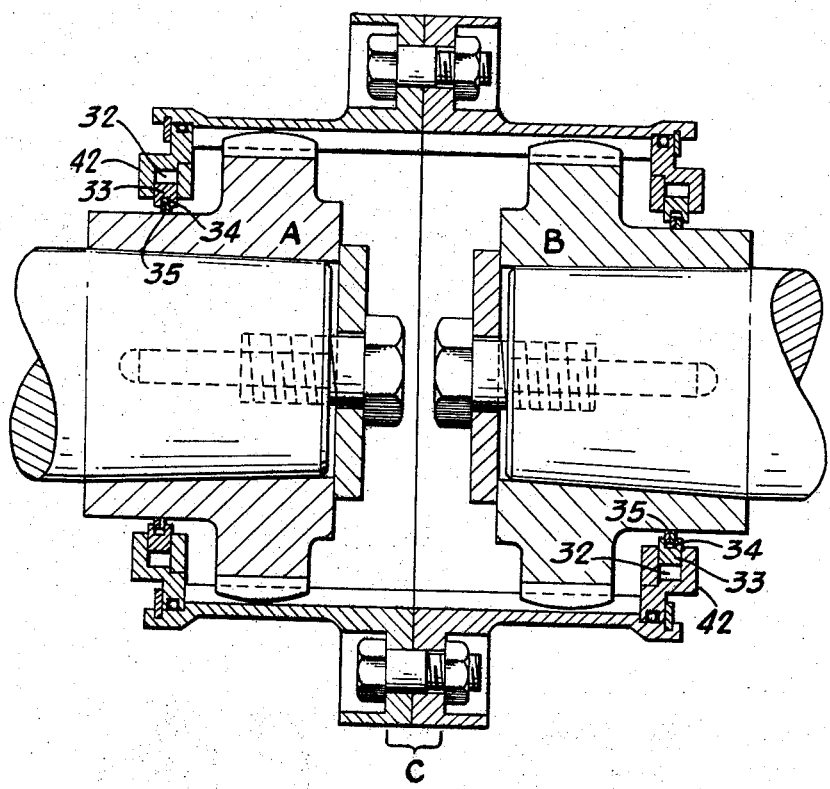
FIGURE 8 is a sectional view of a double-engagement type gear coupling illustrating the novel seal used between the sleeve and both hubs of the coupling.

The preferred embodiment has been illustrated as being used in a flex-rigid type gear coupling, that is, the type wherein the coupling hub is rigidly secured to one shaft and the coupling sleeve is rigidly secured to a second shaft. The seal may, however, be advantageously used, FIGURE 8, in a full flex or double engagement type coupling, that is, the type wherein one coupling hub A is secured to one shaft, a similar hub B is secured to a second shaft, and a coupling sleeve C connects both hubs in flexible operative engagement. In this instance, the seal may be advantageously used between both hubs and the sleeve, similar to the embodiments disclosed herein.

Having thus described my invention in its best embodiment and mode of operation, what I desire to claim by Letters Patent is:

1. A coupling for transmitting torque between a pair of shafts whose axes may be misaligned, comprising:
 a coupling sleeve having internal spur gear teeth therein secured to one of the shafts for rotation therewith;
 a coupling hub having external spur gear teeth thereon secured to the other of said shafts for rotation therewith and operatively connected to said sleeve for rotation therewith; and
 means for retaining lubricant between said sleeve and said hub including,
 a first ring connected to said sleeve and surrounding said hub and having a first annular slot therein facing said hub,
 a second ring adapted to fit in said first annular slot and surround said hub and move in said slot radially of said hub should any misalignment of said shafts exist,
 said second ring having a second annular slot facing said hub, and
 a helical ring adapted to fit in said second slot and surround said hub,
 whereby misalignment of said shafts may cause relative movement of said second ring in said first slot and relative movement of said helical ring in said second slot.

2. The coupling of claim 1 wherein the helical ring has coils of rectangular cross-section with the large dimension of the rectangle extending radially of the helix and the short dimension extending axially of the helix.

3. A coupling for transmitting torque between a pair of shafts whose axes may be misaligned, comprising:
 first and second coupling hubs having external spur gear teeth thereon secured for rotation with said first and second shafts respectively;
 a coupling sleeve having internal spur gear teeth therein operatively connecting said coupling hubs for rotation therewith;
 means for retaining lubricant between said hubs and said sleeve including,
 first rings connected to said sleeve at opposite ends thereof and surrounding said hubs respectively, said first rings having first annular slots therein facing said hubs;
 second rings adapted to fit within said first annular slots respectively and surrounding said hubs and movable in said slots radially of said hubs should any misalignment of said shafts exist, said second rings having second annular slots facing said hubs; and helical rings adapted to fit within said second annular slots and surrounding said hubs respectively, said helical rings each having at least one and one-half washer-like adjacent coils, whereby misalignment of said shafts may cause relative movement of said second rings in said first slots and relative movement of said helical rings in said second slots.

4. In a shaft coupling having a sleeve and a hub, sealing apparatus comprising:

a first ring secured to said sleeve and having a first annular slot therein facing said hub;

a second ring within said first annular slot adapted to move radially therein, said second ring having a second annular slot therein facing said hub; and a helical ring within said second annular slot and in sealing engagement with said hub and adapted to move radially in said second slot, whereby said second ring moves radially in said first annular slot and said helical ring moves radially in said second annular slot in response to misalignment between said sleeve and said hub."

5. A coupling for transmitting torque between a pair of shafts whose axes may be misaligned, comprising:

a coupling sleeve having internal spur gear teeth therein secured to one of the shafts for rotation therewith;

a coupling hub having external spur gear teeth thereon secured to the other of said shafts for rotation therewith and operatively connected to said sleeve for rotation therewith; and means for retaining lubricant between said sleeve and said hub including, a first ring connected to said hub and surrounded by said sleeve and having a first annular slot therein facing said sleeve, a second ring adapted to fit in said first annular slot and surrounded by said sleeve and movable in said slot radially of said sleeve should any misalignment of said shafts exist, said second ring having a second annular slot therein facing said sleeve, and a helical ring adapted to fit in said second slot and surrounded by said sleeve, whereby misalignment of said shafts may cause relative movement of said second ring in said first slot and relative movement of said helical ring in said second slot.

References Cited
UNITED STATES PATENTS

| | | | |
|---|---|---|---|
| 2,035,171 | 3/1936 | Loewus | 64—9 |
| 2,091,947 | 8/1937 | Cords | 277—203 |
| 2,271,060 | 1/1942 | Case | 64—9 |
| 2,566,448 | 9/1951 | Heintz et al. | 277—203 X |
| 2,959,943 | 11/1960 | Allen | 64—9 |
| 3,243,973 | 11/1966 | Kraeling | 64—9 |

HALL C. COE, *Primary Examiner.*